United States Patent [19]
Nordstrom et al.

[11] Patent Number: 5,574,761
[45] Date of Patent: Nov. 12, 1996

[54] FUEL CHANNELS WITH OFF-CENTERLINE WELDS

[75] Inventors: Neal C. Nordstrom, Poway; Joseph E. Conway, El Cajon; Donald R. Wozniak, San Diego, all of Calif.

[73] Assignee: CRS Holdings, Inc., Wilmington, Del.

[21] Appl. No.: 536,513

[22] Filed: Sep. 29, 1995

[51] Int. Cl.$^6$ .................................................. G21C 3/324
[52] U.S. Cl. ........................... 376/463; 376/434; 376/443
[58] Field of Search ...................................... 376/434, 443, 376/444, 448, 463, 900

[56] References Cited

U.S. PATENT DOCUMENTS

| | | |
|---|---|---|
| 3,715,274 | 2/1973 | Venier et al. . |
| 3,936,350 | 2/1976 | Borst . |
| 3,986,654 | 10/1976 | Hart et al. . |
| 4,478,786 | 10/1984 | Andersson et al. . |
| 4,749,543 | 6/1988 | Crowther et al. . |
| 4,749,544 | 6/1988 | Crowther et al. ................ 376/443 |
| 4,889,684 | 12/1989 | Johansson . |
| 4,970,047 | 11/1990 | Ueda et al. . |
| 5,002,725 | 3/1991 | Lettau et al. . |
| 5,106,575 | 4/1992 | Nakamura et al. . |
| 5,118,467 | 6/1992 | Lippert et al. . |
| 5,128,098 | 7/1992 | Nakamura et al. . |
| 5,232,658 | 8/1993 | Lippert . |
| 5,253,278 | 10/1993 | Kanazawa et al. . |
| 5,265,139 | 11/1993 | Yanagi et al. . |
| 5,345,486 | 9/1994 | Reese ................................... 376/443 |

*Primary Examiner*—Daniel D. Wasil
*Attorney, Agent, or Firm*—Dann, Dorfman, Herrell and Skillman, P.C.

[57] ABSTRACT

A nuclear fuel channel has four corners and four elongated sidewalls disposed between the corners so as to provide a polygonal transverse cross-section. Each of the channel sidewalls has a longitudinal centerline that coincides with a line of maximum stress that is imposed on the sidewall during in-reactor service. The sidewalls have one or more longitudinal off-center lines that are located between the longitudinal centerline and one of the corners abutting the elongated sidewall. The longitudinal off-center line coincides with a line of minimum stress imposed on an elongated sidewall during in-reactor service. A weld is formed along the length of the off-center line on at least two of the sidewalls. At least one of the off-center line welds is also a seam weld. The disclosed arrangement provides improved resistance to bulging of the channel sidewalls during in-reactor service.

4 Claims, 3 Drawing Sheets

FUEL CHANNELS WITH OFF-CENTERLINE WELDS

FIELD OF THE INVENTION

This invention relates to fuel bundles for nuclear reactors and in particular to a channel for enclosing a bundle of nuclear fuel rods that provides improved resistance to bulging.

BACKGROUND OF THE INVENTION

Boiling water nuclear reactors contain fissionable fuel which is formed in bundles of fuel rods. The fuel rod bundles are encased in a channel having a polygonal transverse cross-section, usually square. During operation of the reactor, a pressure differential develops between the interior and exterior of the fuel channel. Over time, the pressure differential, which can be quite high, causes bulging of the flat sidewalls of the fuel channel. This phenomenon is well known and is described further in U.S. Pat. No. 4,749,544 (Crowther et al.).

Many nuclear fuel channels are fabricated from two or more pieces of a zirconium alloy sheet which are bent into a desired shape and then welded together to form the channel. Processes for fabricating such channels are described in the Crowther et al. patent, as well as, U.S. Pat. No. 4,604,785 (Eddens). Such channels have two or more seam welds. Another method of fabricating fuel channels is to form a tube from the zirconium alloy sheet and then square the cross-section of the tube, for example, by passing it through a Turk's-head machine. This latter type of channel has only one seam weld and a process for making this type of fuel channel is described in U.S. Pat. No. 3,986,654 (Hart et al.).

In order to minimize longitudinal bowing of the last-described type of fuel channel, non-seam welds have been applied to one or all of the sides not containing a seam. The seam and non-seam welds are placed on the centerlines of the respective sidewalls for ease of fabrication. Experience with the known types of fuel channels that are welded in that manner has shown that after extended periods of in-reactor service, undesirable bulging of the channel sidewalls occurs. Excessive bulging of the fuel channels inhibits insertion of the control rods used to control the nuclear reaction. Accordingly, it would be highly desirable to have a fuel channel that is fabricated in such a way as to substantially reduce the amount of bulging that occurs during normal use.

SUMMARY OF THE INVENTION

The above-described problem associated with the known fuel channels is solved to a large degree in accordance with one aspect of the present invention whereby there is provided a nuclear fuel channel having four corners and four elongated sidewalls disposed between the corners so as to provide a polygonal transverse cross-section. Each of the channel sidewalls has a longitudinal centerline that coincides with a line of maximum stress that is imposed on the sidewall during in-reactor service. Each sidewall also has a longitudinal off-center line that is located between the longitudinal centerline and one of the corners abutting the elongated sidewall. The longitudinal off-center line coincides with a line of minimum stress imposed on the elongated sidewall during in-reactor service. A weld is formed along the length of the off-center line on at least two of the sidewalls. At least one of the off-center line welds is also a seam weld.

BRIEF DESCRIPTION OF THE DRAWINGS

Further objects and advantages of the present invention will become apparent from the following detailed description and the accompanying drawings in which.

DETAILED DESCRIPTION

Figure 1A:
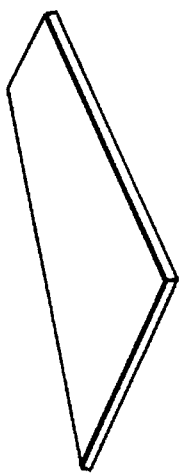
FIGS. 1A–1H show the principal processing steps used in making a fuel channel in accordance with the present invention.
Figure 1B:
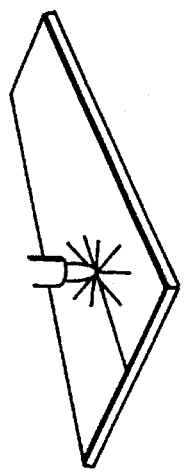
Figure 1C:
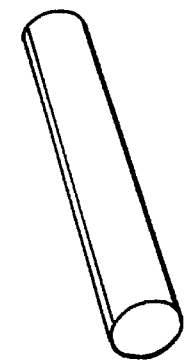

Referring now to FIGS. 1A–1H, a process for fabricating a preferred embodiment of a fuel channel in accordance with the present invention will be described. The fuel channel is formed from a single piece of alloy sheet of appropriate length, width and thickness. The thickness of the alloy sheet is preferably uniform across the length and width of the sheet material. The preferred alloy is a zirconium alloy, for example, Zircaloy-4 alloy or Zircaloy-2 alloy. As shown in FIG. 1B, a first weld bead is applied to a surface of the sheet alloy. The preferred method of forming the longitudinal weld is tungsten inert gas (TIG) welding for enhanced resistance to bowing. The alloy sheet is then formed into a cylindrical or round tube by press forming as shown in FIG. 1C. The press forming operation can be performed on any appropriate machine such as a press brake.

Figure 1D:
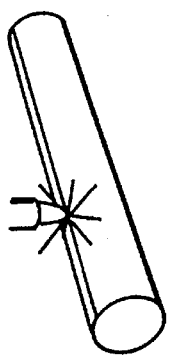
Figure 1E:
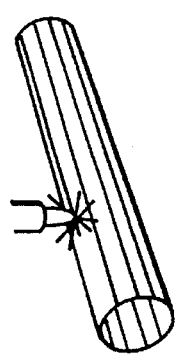
Figure 1F:
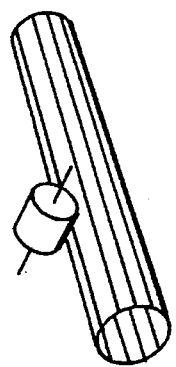

As a result of the press forming operation, the opposite edges of the sheet alloy are brought into close proximity to each other to form an open longitudinal seam. As shown in FIG. 1D the edges are welded together with a continuous longitudinal TIG weld to close the seam. Referring now to FIG. 1E, six (6) additional weld beads are applied to the exterior surface of the tube. These additional welds are spaced from each other and from the first two welds on the exterior surface of the tube. The longitudinal welds are then reduced as shown in FIG. 1F, for example by roll planishing, to smooth out the weld bead and minimize any circumferential distortion resulting from the forming and/or welding processes.

Figure 1G:
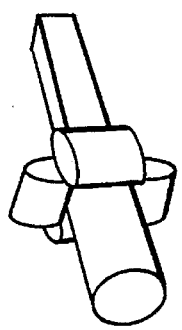

The as-welded tube is then passed through a Turk's-head machine, as shown in FIG. 1G, to rough form it to a square cross section. In performing the rough squaring operation, the round tube is oriented such that the longitudinal welds will be located off the centerlines of the sidewalls of the tube after the rough squaring operation. The longitudinal welds are located so as to be coincident with the lines of minimum stress associated with the sidewalls of the channel. The exact locations of the minimum stress lines vary depending on the cross-sectional geometry of the channel and also on the wall thickness of the sidewalls. The minimum stress points of a channel sidewall can be readily determined using analytical techniques known to those skilled in the art of fuel channel design. However, in the absence of such an analysis, equal spacing of the welds has provided good results as a first approximation.

Figure 1H:
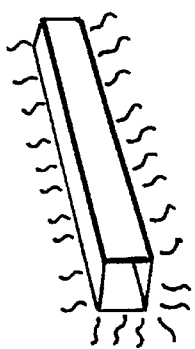

As shown in FIG. 1H, the rough-squared channel is then thermally sized to final dimension and stress relieved. The preferred thermal sizing technique is described in the Hart et al. patent, the disclosure of which is incorporated herein by reference.

Figure 2:
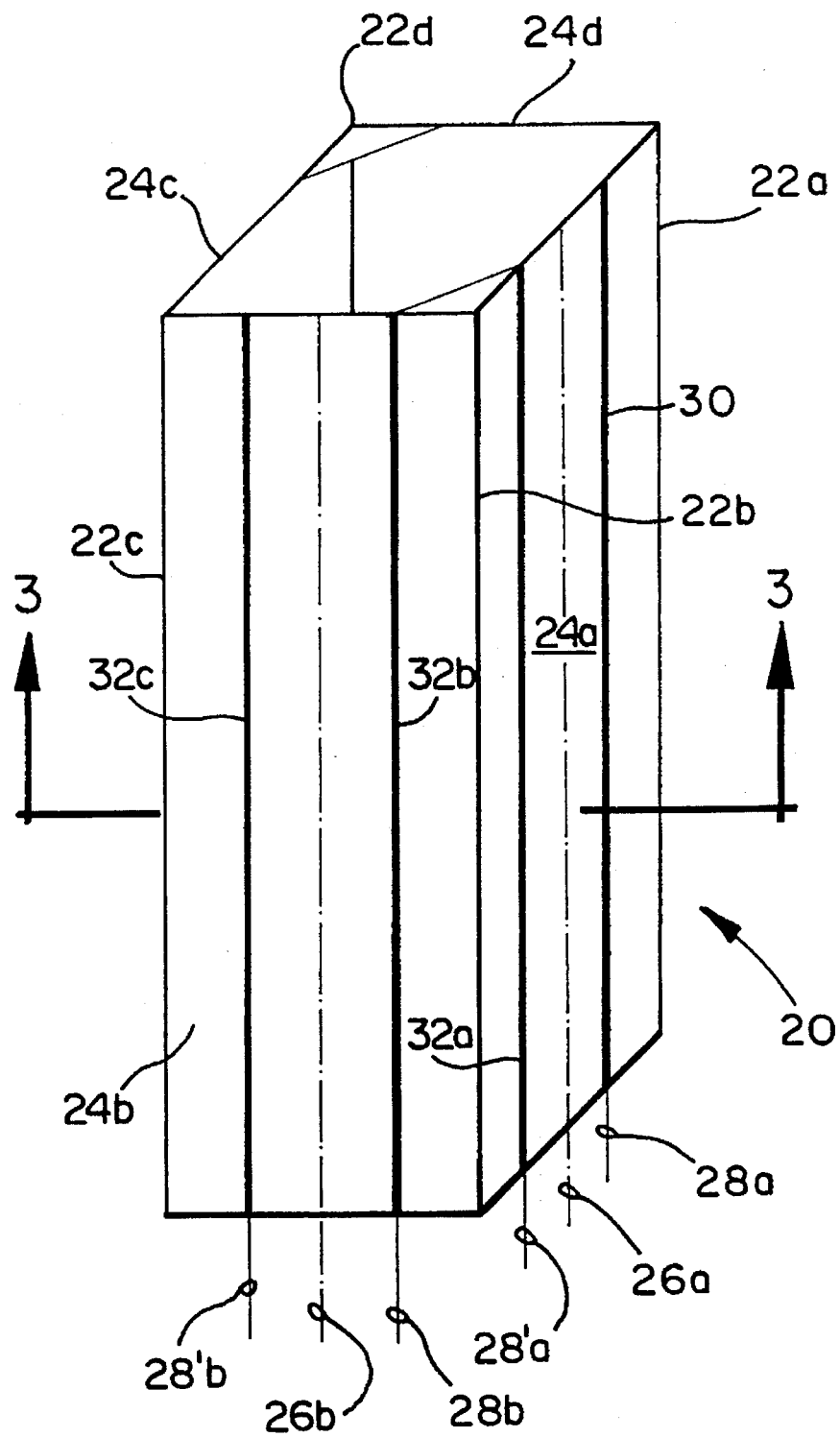
FIG. 2 is a side elevation view of a fuel channel according to the present invention.
Figure 3:
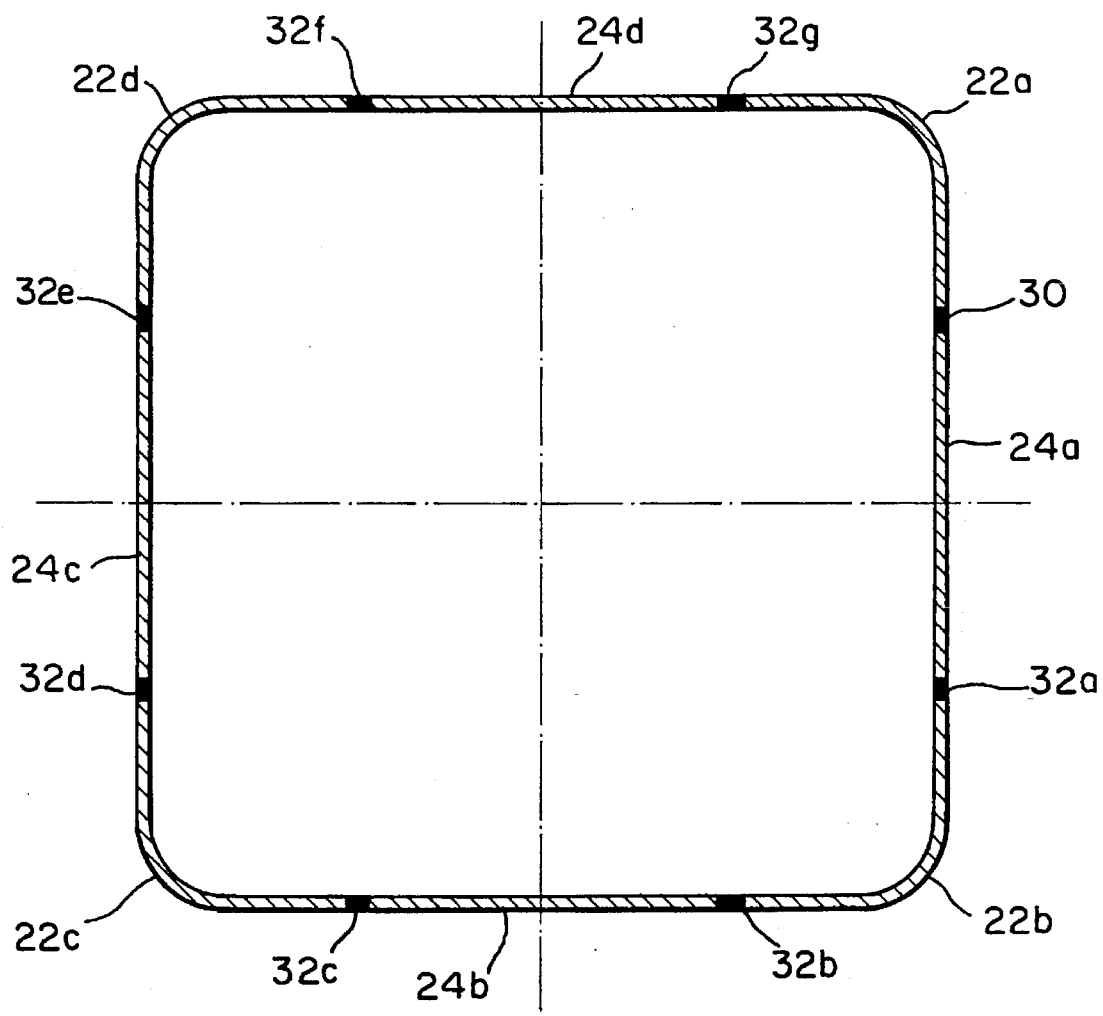
FIG. 3 is a cross-sectional view of the fuel channel shown in FIG. 2 as viewed along line 3—3 therein.

Referring now to FIGS. 2 and 3, there is shown a preferred embodiment of a fuel channel 20 formed in accordance with the present invention. Fuel channel 20 has four corners 22a, 22b, 22c, and 22d and four sidewalls 24a, 24b, 24c, and 24d interposed between the corners so as to form a square in transverse cross-section, as shown in FIG. 3. Each sidewall has respective longitudinal centerlines 26a, 26b, 26c, and 26d. On each sidewall, a first off-center line is located between the respective centerline and one of the corners abutting the respective sidewall. The first off-center lines are designated 28a, 28b, 28c, and 28d. A second off-center line is located between the centerline of each sidewall and the other corner abutting the respective sidewall. The second off-center lines are designated 28'a, 28'b, 28'c, and 28'd. A seam weld 30 is located along one of the off-center lines 28a. Non-seam welds 32a, 32b, 32c, 32d, 32e, 32f, and 32g are located along the remaining off-center lines 28'a, 28b, 28'b, 28c, 28'c, 28d, and 28'd.

It will be appreciated that the advantages that derive from a fuel channel made in accordance with the present invention can be realized with fewer than eight off-centerline welds. However, as a minimum it is preferred to have at least one off-centerline weld on at least two opposing sidewalls. In a further embodiment, a fuel channel in accordance with the present invention has at least one off-centerline weld on each of the four sidewalls.

Furthermore, a fuel channel in accordance with the present invention can be fabricated by other methods. For example, first and second U-shaped channels are formed from sheet or strip of a desired alloy. In forming the U-shaped channels, one leg of each channel is dimensioned shorter than the other leg. The U-shaped channels are then welded together with the short leg on each U-channel being attached to the long leg on the other U-channel. The lengths of the long and short legs of the U-channels are selected so that the seam welds are located along the minimum stress lines of the sidewalls containing welds. Non-seam welds may also be formed along the lines of minimum stress on the sidewalls without seam welds for metallurgical balance.

Alternatively, four L-shaped pieces can be welded together with the short leg of each piece being attached to the long leg of an adjacent piece. The lengths of the long and short legs of each L-shaped piece would be selected so that the seam welds are located along the minimum stress lines of the sidewalls of the finished channel.

The terms and expressions which have been employed herein are used as terms of description, not of limitation. There is no intention in the use of such terms and expressions of excluding any equivalents of the features shown and described or portions thereof. However, it is recognized that various modifications are possible within the scope of the invention claimed.

What is claimed is:

1. A nuclear fuel channel comprising:

four corners and four elongated sidewalls each disposed between two of said corners to provide a polygonal transverse cross-section, said sidewalls and said corners being formed of a sheet alloy;

two of said sidewalls each having:

a longitudinal centerline that coincides with a line of maximum stress on said sidewall;

a first longitudinal off-center line, that is located between the longitudinal centerline and one of the corners abutting the elongated sidewall and is coincident with a line of minimum stress on said elongated sidewall; and a weld formed along the length of said first longitudinal off-center line.

2. A fuel channel as recited in claim 1 wherein each of said two sidewalls comprises:

a second longitudinal off-center line, that is located between the longitudinal centerline and the other corner abutting the elongated sidewall and coincides with a second line of minimum stress on said elongated sidewall; and a second weld formed along the length of said second longitudinal off-center line.

3. A fuel channel as recited in claim 1 wherein four of said sidewalls each have:

a longitudinal centerline that coincides with a line of maximum stress on said sidewall;

a first longitudinal off-center line, that is located between the longitudinal centerline and one of the corners abutting the elongated sidewall and coincides with a line of minimum stress on said elongated sidewall; and a weld formed along the length of said first longitudinal off-center line.

4. A fuel channel as recited in claim 3 wherein each of said four sidewalls comprises:

a second longitudinal off-center line, that is located between the longitudinal centerline and the other corner abutting the elongated sidewall and that coincides with a second line of minimum stress on said elongated sidewall; and a second weld formed along the length of said second longitudinal off-center line.

* * * * *